(12) United States Patent
Parsons

(10) Patent No.: US 7,577,802 B1
(45) Date of Patent: Aug. 18, 2009

(54) ACCESSING A RESERVABLE DEVICE BY TRANSIENTLY CLEARING A PERSISTENT RESERVATION ON THE DEVICE IN MULTI-HOST SYSTEM

(75) Inventor: Stephen Parsons, Los Gatos, CA (US)

(73) Assignee: NetApp, Inc., Sunnyvale, CA (US)

(*) Notice: Subject to any disclaimer, the term of this patent is extended or adjusted under 35 U.S.C. 154(b) by 319 days.

(21) Appl. No.: 11/109,217

(22) Filed: Apr. 18, 2005

(51) Int. Cl.
*G06F 3/06* (2006.01)
*G06F 13/00* (2006.01)
*G06F 13/28* (2006.01)
*G06F 15/167* (2006.01)
*G06F 15/173* (2006.01)
*G06F 12/00* (2006.01)
*G06F 12/14* (2006.01)
*G06F 13/22* (2006.01)
*G06F 13/14* (2006.01)
*G06F 13/38* (2006.01)

(52) U.S. Cl. ............... 711/156; 709/214; 709/216; 709/226; 711/4; 711/100; 711/111; 711/112; 711/145; 711/147; 711/148; 711/150; 711/151; 711/152; 711/163; 710/200; 710/220; 710/240

(58) Field of Classification Search ............ None
See application file for complete search history.

(56) References Cited

U.S. PATENT DOCUMENTS

| | | | |
|---|---|---|---|
| 5,892,955 A * | 4/1999 | Ofer | 710/200 |
| 6,192,483 B1 * | 2/2001 | Moiin et al. | 714/4 |
| 6,289,356 B1 | 9/2001 | Hitz et al. | |
| 6,629,062 B2 * | 9/2003 | Coffey et al. | 702/188 |
| 6,954,881 B1 * | 10/2005 | Flynn, Jr. et al. | 714/43 |
| 6,973,511 B2 * | 12/2005 | Damron et al. | 710/37 |
| 2003/0065782 A1 * | 4/2003 | Nishanov et al. | 709/226 |
| 2004/0024962 A1 * | 2/2004 | Chatterjee et al. | 711/114 |

\* cited by examiner

*Primary Examiner*—Stephen C Elmore
*Assistant Examiner*—Marwan Ayash
(74) *Attorney, Agent, or Firm*—Cesari and McKenna, LLP

(57) ABSTRACT

Systems, methods, and computer program products are presented for transiently clearing a reservation on a device, where the reservation belongs to a host that owns the device and the reservation blocks a host that does not own the device from performing an operation with the device. The reservation is cleared transiently by the host that does not own the device. While the reservation is cleared, the operation is performed with the device using the host that does not own the device.

36 Claims, 4 Drawing Sheets

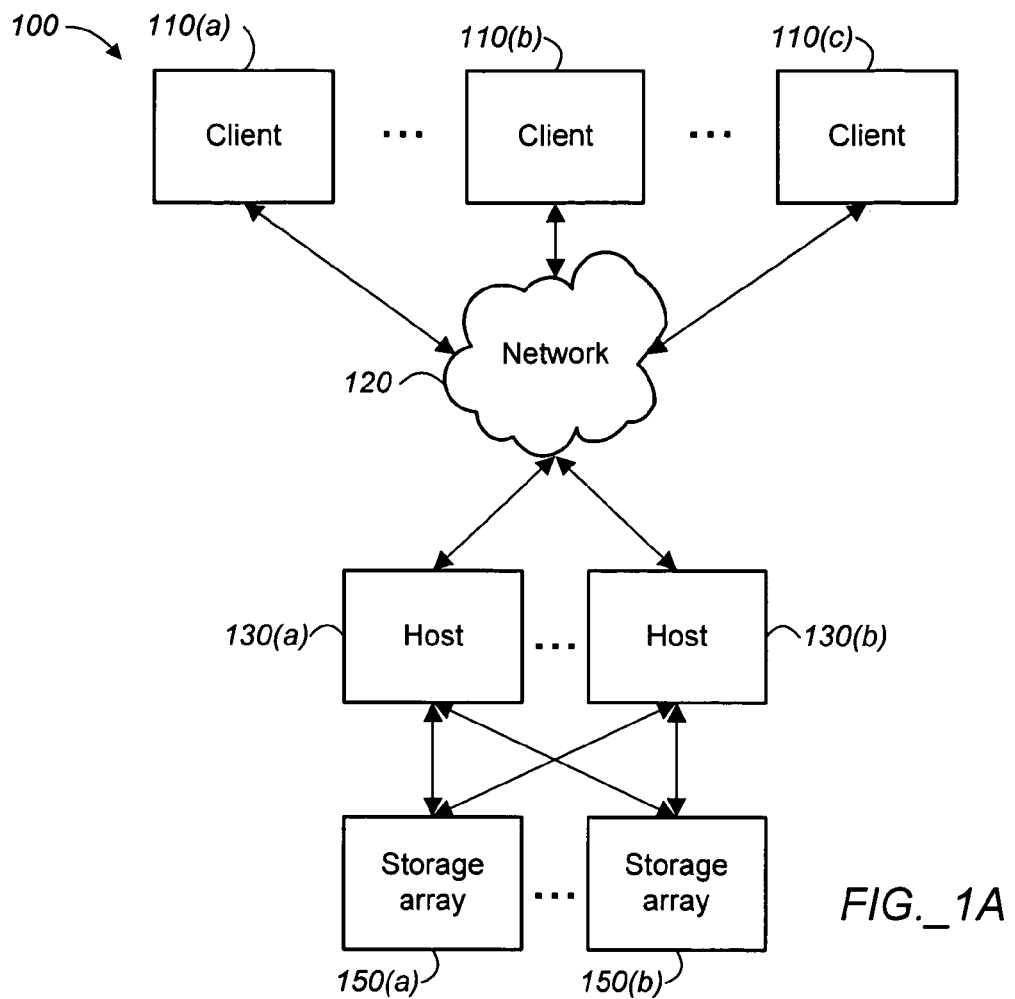
FIG._1A
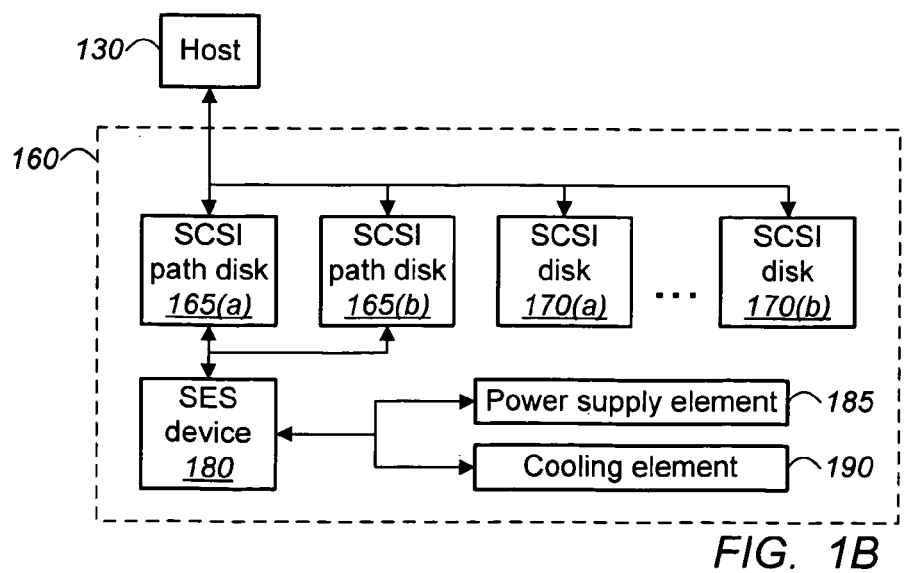
FIG._1B

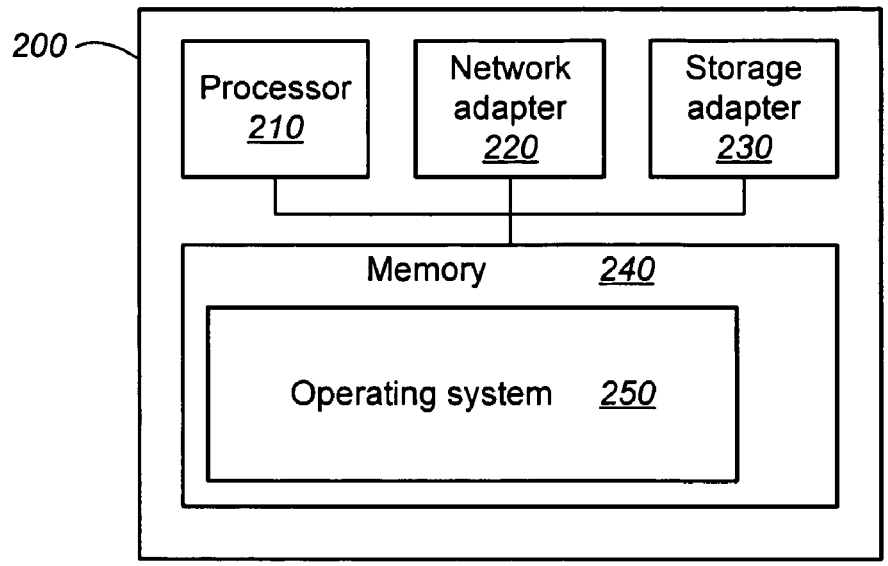
FIG._2
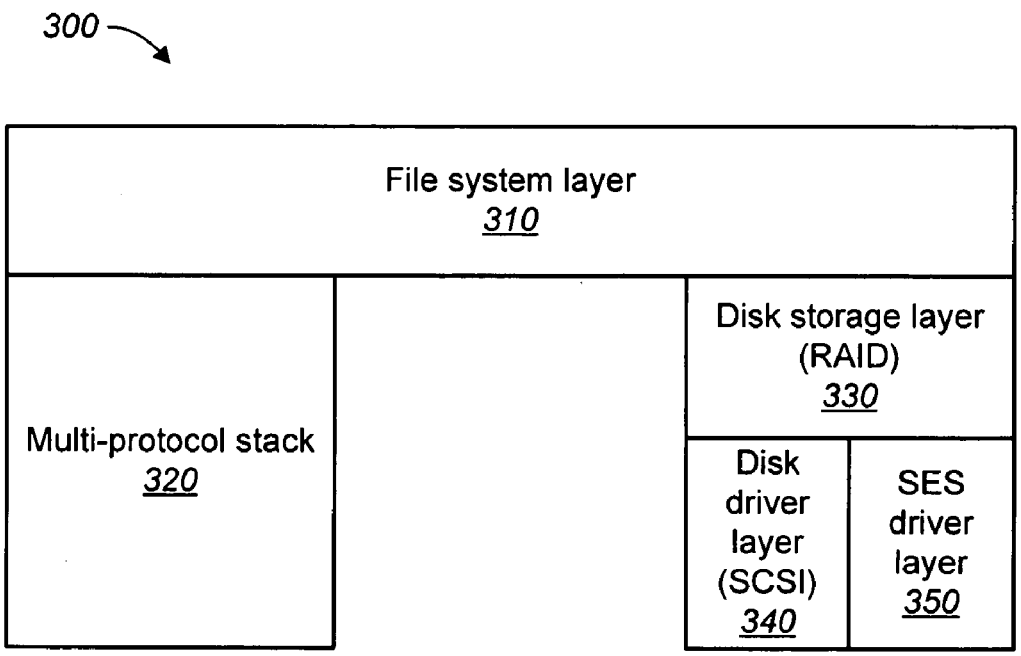
FIG._3

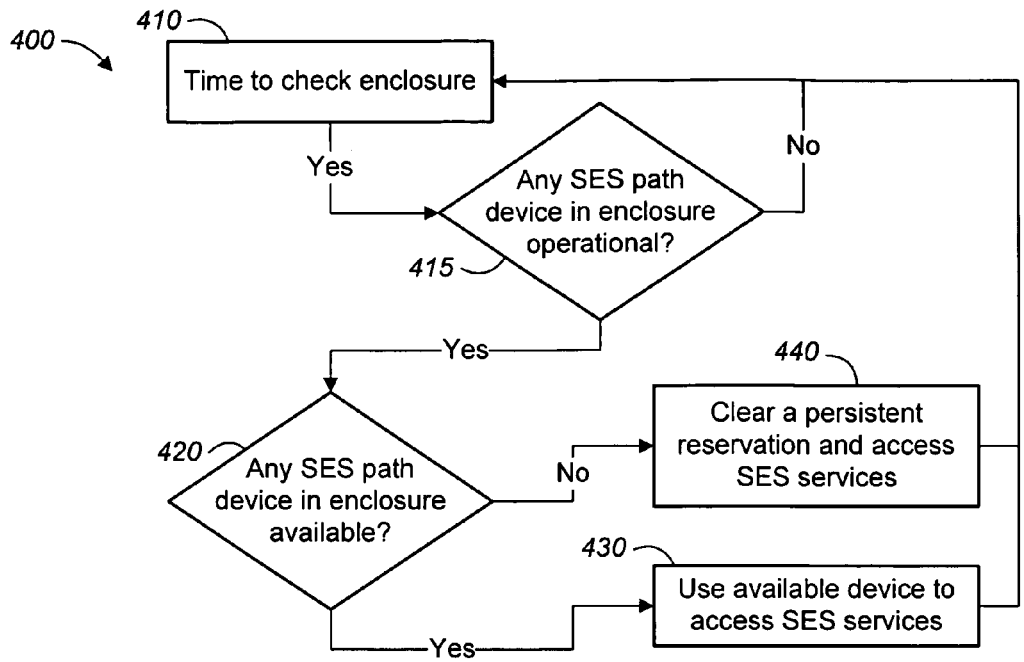
*FIG._4A*
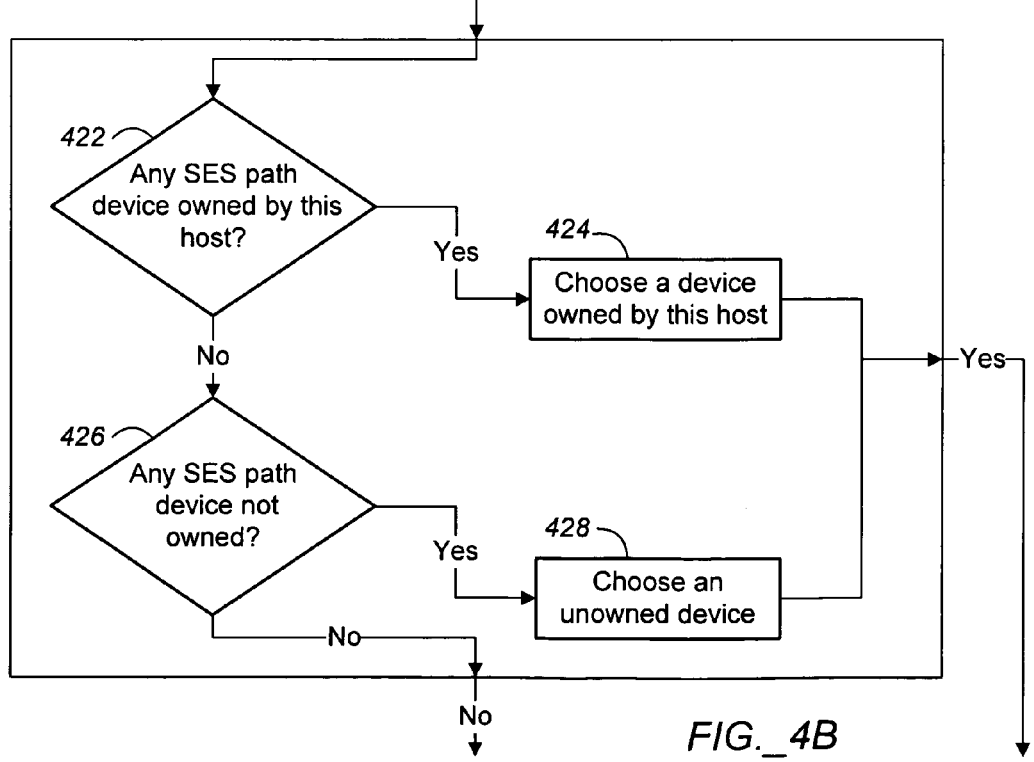
*FIG._4B*

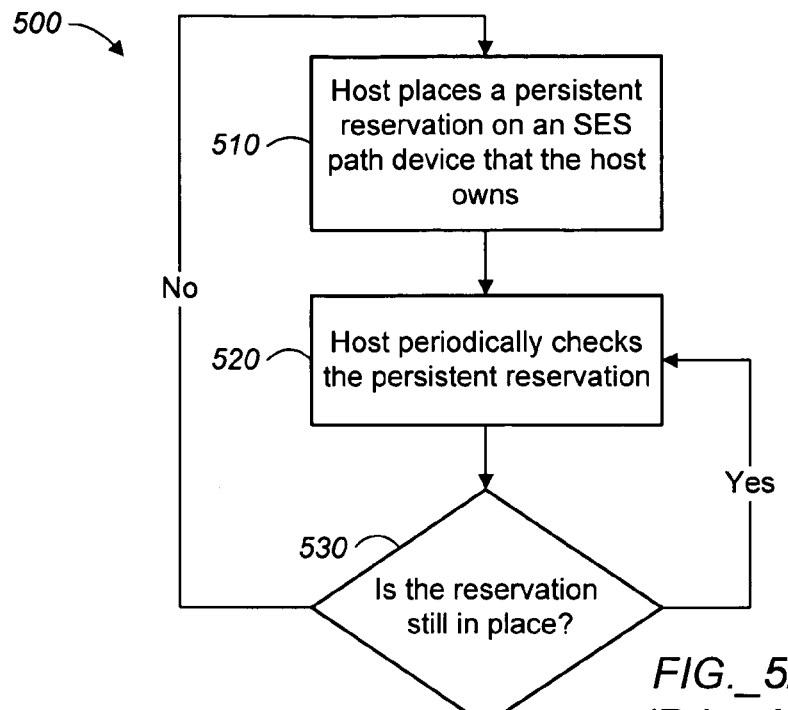
*FIG._5A (Prior Art)*
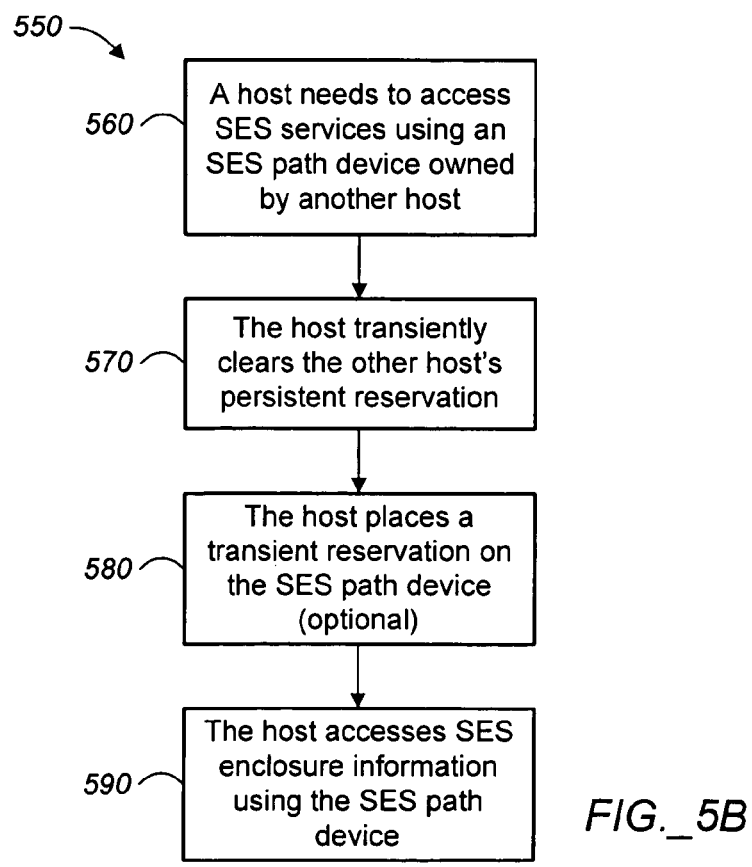
*FIG._5B*

ACCESSING A RESERVABLE DEVICE BY TRANSIENTLY CLEARING A PERSISTENT RESERVATION ON THE DEVICE IN MULTI-HOST SYSTEM

BACKGROUND

The present invention relates to data storage systems.

A data storage system allows one or more client devices to access (i.e., read and/or write) data on the data storage system through a host device, such as a file server, that is physically separate from the client. The clients typically communicate with the host over a network, such as a local area network, wide area network, virtual private network, or point-to-point connection. The host typically is connected to one or more storage devices (e.g., arrays of disks, tapes, or solid-state memory) directly or over a network, such as a storage area network (SAN). Some data storage systems include two or more hosts, each of which can access the storage devices. Examples of data storage systems include the FAS900 and FAS200 families of fabric-attached storage systems, which are available from Network Appliance, Incorporated of Sunnyvale, Calif.

Each host typically runs an operating system that includes a file system. An example of a suitable operating system for a host is the Data ONTAP™ microkernel operating system available from Network Appliance, Incorporated. The file system organizes data on the storage devices, typically using structured directories that contain files. An example of a file system is the Write Anywhere File Layout (WAFL®) file system available from Network Appliance, Incorporated, and described in commonly assigned U.S. Pat. No. 6,289,356, entitled "Write Anywhere File System Layout," which is hereby incorporated by reference in its entirety. The WAFL file system is optimized to work in a data storage system that uses a Redundant Array of Independent (or Inexpensive) Disks (RAID) design, which helps protect against data loss in the event of a disk failure. In a RAID 4 system, for example, data is striped across multiple disks and is protected by parity information. If a disk in the array of disks fails, the parity information can be used to recover the lost data from the failed disk.

The disks in a disk array can be, for example, Small Computer System Interface (SCSI) disks. The disks typically are installed in one or more enclosures, each of which contains multiple disks and associated support elements. An example of an enclosure is a box, shelf, rack, or set of these that provides power, cooling, mechanical protection, and external electronic interfaces for one or more enclosure devices. Possible enclosure devices include SCSI devices, such as SCSI disk drives, and non-SCSI devices. SCSI Enclosure Services (SES) can be used to manage and sense the state of elements (e.g., power supplies, cooling fans, and data storage disks) in an enclosure. An enclosure typically includes a plug-in SES device or an integrated SES device that allows a host to access SES services. In some systems, a host can directly access the SES device. In other systems, a host accesses the SES device through an SES path device. For example, an enclosure containing SCSI disks can include a limited number of device slots (e.g., 2 or 4 slots) that allow the SCSI disks located in those slots to operate as SES path devices. SES path devices pass information between the enclosure's SES device and the host, typically by interfacing between an SES bus and a bus (e.g., a fibre channel bus) that connects the SES path device to the host. More information about SES can be found in the ANSI document INCITS 305-1998 (R2003), "Information Technology—SCSI-3 Enclosure Services (SES) Command Set."

Examples of operations that can be performed on an enclosure using SES include detecting the presence or absence of disks in slots, obtaining ambient temperature readings, setting allowable temperature thresholds for the enclosure, and setting or clearing disk status lights. These and similar sensing (that is, detecting) and managing operations are performed by reading SES configuration pages, enclosure status pages, or element descriptor pages and by writing SES enclosure control pages using the SES SEND DIAGNOSTIC and RECEIVE DIAGNOSTIC RESULTS commands.

In a fibre-channel storage system, each disk in an enclosure can be owned by a single host. A host is said to own a disk if the configuration of the storage system allows the host to perform certain operations (e.g., writes) on the disk that other hosts are restricted from performing on that disk. In a clustered-host system, multiple hosts are connected to a common set of disks, and multiple hosts can own disks in a single enclosure. In a two-host system, every disk can be connected to both hosts because each disk typically includes two fibre-channel connections. In a system with more than two hosts, a disk can be connected to multiple hosts through a switch. One host can own a given disk, or the disk can be unowned. Disk ownership can be handled in software to allow the ownership of a disk to be changed without requiring a change in the physical connections between the hosts and the disk. A host that owns a disk typically can place a reservation (e.g., a SCSI reservation, SCSI persistent reservation, or non-SCSI reservation) on the disk. A reserved disk typically enforces the reservation to block hosts other than the reserving host from performing certain operations using the disk. For example, a disk with a SCSI persistent reservation from one host will allow another host to read data from the disk, but the disk does not allow any other host to write data to the disk, thus preventing rogue writes if a software anomaly occurs on another host. A side effect of the persistent reservation is that only the host that owns a disk which is an SES path device (an SES path disk) can use the SES path disk to access SES functions; other hosts are blocked from accessing SES functions using the SES path disk.

It is useful for a host that owns one or more disks in an enclosure to be able to sense and manage the state of elements in the enclosure. The host can do this if the host owns an operational SES path disk in the enclosure or if an SES path disk in the enclosure is unowned. If, however other hosts own all SES path disks, the host cannot access SES functions.

One possible solution is to constrain a system administrator to use only configurations in which a host that owns any disk in an enclosure owns at least one SES path disk in the enclosure. This solution decreases the flexibility of configuring the enclosure and assigning ownership. In addition, if the SES path disk that the host owns fails, the host may lose the ability to access SES services for the enclosure.

SUMMARY

Systems, methods, and products, including computer-program products, are provided that allow a host which does not own an SES path device in an enclosure to access SES services. The host transiently clears a persistent reservation that another host has placed on an SES path device and uses the SES path device to access SES services.

In one aspect, the invention features a system that includes one or more enclosures that provide an operating environment for enclosure devices, where each enclosure manages and senses a state of the enclosure and enclosure devices installed in the enclosure. A first host is coupled in data communication with a first plurality of enclosure devices, where each of the enclosure devices in the first plurality of enclosure devices is installed in one of the one or more enclosures. The first plurality of enclosure devices includes an SES path device, and the SES path device is installed in a first enclosure of the one or more enclosures. A second host is coupled in data communication with a second plurality of enclosure devices, where each of the enclosure devices in the second plurality of enclosure devices is installed in one of the one or more enclosures. The second plurality of enclosure devices also includes the SES path device. The SES path device provides access to services of the first enclosure for the first host and for the second host in response to requests from the first host and the second host, respectively. The second host owns the SES path device and places a reservation on the SES path device. The SES path device accepts the reservation from the second host and enforces the reservation to block access to the services of the first enclosure by the first host. If the second host has a reservation in place on the SES path device, the first host transiently clears the reservation made by the second host and accesses the services of the first enclosure using the SES path device.

Particular implementations can include one or more of the following features. The one or more enclosures process commands that are part of the SCSI Enclosure Services command set. The SES path device is a SCSI disk or a fibre-channel SCSI disk. The first host and second host are each a data server. The first host is coupled with the first plurality of enclosure devices over a fibre-channel SAN, and the second host is coupled with the second plurality of enclosure devices over the SAN. The first host and the second host are clustered such that the first plurality of enclosure devices and the second plurality of enclosure devices are identical. The second host reestablishes the reservation on the SES path device after the first host transiently clears the reservation. The first host is a monitor that does not perform storage operations. The first host transiently clears the reservation only after determining that the enclosure does not include any available SES path devices. Determining that the enclosure does not include any available SES path devices includes first determining that the first host does not own any SES path devices in the enclosure and then determining that there are no unowned SES path devices in the enclosure.

In another aspect, the invention features a computer program product and a method that include transiently clearing a reservation on a first SES path device, where the reservation belongs to a host that owns the first SES path device. A host that does not own the first SES path device transiently clears the reservation. The first SES path device is installed in an enclosure, and the reservation blocks the host that does not own the first SES path device from accessing services of the enclosure through the first SES path device. The computer program product and the method included accessing services of the enclosure through the first SES path device using the host that does not own the first SES path device.

Particular implementations can include one or more of the following features. The enclosure processes commands that are part of the SCSI Enclosure Services command set. The first SES path device is a SCSI disk or a fibre-channel SCSI disk included in a plurality of enclosure devices installed in the enclosure. The host that owns the first SES path device and the host that does not own the first SES path device are each a data server. The host that does not own the first SES path device and the host that owns the first SES path device are coupled with the plurality of enclosure devices over a fibre-channel SAN. The host that owns the first SES path device reestablishes the reservation on the first SES path device after the host that does not own the first SES path device transiently clears the reservation. The host that does not own the first SES path device is a monitor that does not perform storage operations. The computer program product and method include checking the enclosure, using the host that does not own the first SES path device, for an available second SES path device before clearing the reservation. Checking the enclosure for an available second SES path device includes checking the enclosure for any SES path device in the enclosure that the host that does not own the first SES path device owns and checking the enclosure for any unowned SES path device.

In yet another aspect, the invention features a method that includes transiently clearing a reservation on a device, where the reservation belongs to a host that owns the device and blocks a host that does not own the device from performing an operation with the device. The reservation is cleared transiently by the host that does not own the device. While the reservation is cleared, the operation is performed with the device using the host that does not own the device.

Particular implementations can include one or more of the following features. The host that owns the device and the host that does not own the device are each a data server. The device is a disk drive, and performing the operation with the device includes writing a first set of data to the disk drive. The method includes reading the first set of data from the disk drive using the host that owns the device, writing a second set of data to the disk drive using the host that owns the device, and reading the second set of data from the disk drive using the host that does not own the device. The host that owns the device reestablishes the reservation on the device after the host that does not own the device transiently clears the reservation.

The invention can be implemented to realize one or more of the following advantages. The state of enclosure elements can be managed and sensed by a host that does not own an SES path device in the enclosure. A host that owns an SES path device can maintain ownership even when a non-owning host accesses SES services through the SES path device. A storage system can be configured such that when all SES path devices are operating correctly, no persistent reservations on any SES path device are cleared while still allowing a host access to an enclosure's SES services if an SES path device owned by the host fails. Greater flexibility in the configuration of the system is provided.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 1A is a block diagram of a computing environment.

FIG. 1B is a block diagram of an enclosure connected to a host.

FIG. 2 is a block diagram of a host.

FIG. 3 is a block diagram of software layers.

FIGS. 4A-4B are flowcharts of processes for accessing SES information.

FIG. 5A is a flowchart of a process for placing and maintaining persistent reservations on an SES path device.

FIG. 5B is a flowchart of a process for accessing SES services using an SES path device that is owned by another host.

DETAILED DESCRIPTION

As shown in FIG. 1A, an environment 100 includes clients 110(a)-110(c) that are connected to hosts 130(a)-130(b) through a network 120. The clients 110(a)-110(c) communicate requests for services to the hosts 130(a)-130(b) over the network 120 and receive results back from the hosts 130(a)-130(b) over the network 120. The clients 1110(a)-110(c) typically are computers such as general-purpose computers or application servers. The number of clients can range from one to an arbitrarily large number. The hosts 130(a)-130(b) are capable of accessing data stored on storage arrays 150(a)-150(b). The hosts 130(a)-130(b) are connected to the storage arrays 150(a)-150(b), for example, over a fibre-channel SAN, an iSCSI SAN, or using a network attached storage (NAS) scheme.

The number of hosts can range from two to an arbitrarily large number, and the number of storage arrays can range from one to an arbitrarily large number. The hosts 130(a)-130(b) typically are clustered file servers, and the storage arrays 150(a)-150(b) typically are arrays of magnetic disks, such as fibre-channel SCSI drives, contained in one or more enclosures, each of which includes an SES device. The combination of the hosts 130(a)-130(b) and the storage arrays 150(a)-150(b) forms a data storage system.

As shown in FIG. 1B, a host 130 (e.g., host 130(a) or 130(b) from FIG. 1) is connected to an enclosure 160 (e.g., an enclosure included in storage array 150(a) or 150(b)). The enclosure 160 includes multiple SCSI disks 170(a)-170(b) and two SCSI path disks 165(a), 165(b). The SCSI path disks 165(a), 165(b) are connected to an SES device 180, which, in turn, is connected to a power supply element 185 and a cooling element 190. In this example enclosure 160, the host 130 is not connected directly to the SES device 180, so the SCSI path disks 165(a), 165(b) allow the host 130 to access the SES services offered by the SES device 180. The SES device 180 can sense and manage the state of the SCSI disks 170(a)-170(b) and the SCSI path disks 165(a), 165(b) through a backplane to which each is connected.

As shown in FIG. 2, a host 200 of one implementation includes a processor 210, a network adapter 220 for connecting to and communicating with a network, and a storage adapter 230 for connecting to and communicating with one or more storage arrays. The host 200 also includes memory 240, which includes an operating system 250 (e.g., the Data ONTAP operating system). The operating system 250 includes instructions that are executed on the processor 210 and associated data. The operating system 250 receives requests for file services from the network adapter 220 and accesses data on storage arrays through the storage adapter 230. The operating system also provides data from the storage arrays to the network adapter 220.

As shown in FIG. 3, in one implementation, the software on a host includes multiple software layers 300, including a file system layer 310 (e.g., the WAFL file system), a multi-protocol stack 320, a disk storage layer 330, a disk driver layer 340, and an SES driver layer 350. The multi-protocol stack 320 translates between a data format (e.g., TCP/IP) of a network and a data format of the file system layer 310. The multi-protocol stack 320 additionally can interpret file system protocols, such as the Network File System (NFS) protocol.

The file system layer 310 organizes data on storage arrays and connects the multi-protocol stack 320 to the disk storage layer 330. The disk storage layer 330 implements a disk storage architecture (e.g., a RAID architecture), and the disk driver layer 340 implements a disk access protocol (e.g., a SCSI protocol).

The disk storage layer 330 and the disk driver layer 340 communicate with the SES driver layer 350. The SES driver layer 350 manages and senses the state of SCSI enclosure elements by accessing SES services through one or more SES path devices in enclosures included in storage arrays. The SES driver layer 350 is able to communicate with each SES path device to which a host including the software layers 300 is connected, whether or not the host owns the SES path device. The SES driver layer 350 is able to clear persistent reservations on an SES path device using the SES PERSISTENT RESERVE OUT/CLEAR command on the SES path device and can issue the SES SEND DIAGNOSTIC and RECEIVE DIAGNOSTIC RESULTS commands to access SES services.

As shown in FIG. 4A, a process 400 allows a host to access SES services in an enclosure. The host determines that it is time to check the enclosure (step 410), for example, when a timer runs out. The host ascertains whether the enclosure includes any operational SES path devices (step 415). In certain circumstances, an enclosure might not contain any operational SES path devices, for example, if all SES path devices in the enclosure have failed and/or been removed. If there are no operational SES path devices in the enclosure, the host returns to step 410. If there is at least one operational SES path device in the enclosure, the host checks ownership information for the enclosure to determine whether an SES path device is available (that is, unreserved or reserved by the host that is seeking SES access) in the enclosure (step 420). Each host in a storage system can keep track of what devices it and/or other hosts own by communicating with the other hosts regarding ownership. A storage system also can include a central repository of ownership information (e.g., on a failover monitor) that the host can query.

As shown in FIGS. 4A and 4B, the host can determine whether any SES path devices are available by checking its own ownership information and/or ownership information in the central repository to determine whether the host owns any SES path device in the enclosure (step 422). If the host owns at least one SES path device in the enclosure, the host chooses an SES path device that the host owns (step 424) and uses it to access SES services (step 430). If the host does not own an SES path device in the enclosure, the host checks the ownership information to determine whether any SES path device in the enclosure is unowned (step 426). If so, the host chooses an unowned SES path device (step 428) and uses it to access SES services (step 430). Alternatively, instead of explicitly checking the ownership of SES path devices, the host can simply attempt to access SES services using an SES path device. If the attempt fails, the host tries any remaining SES path devices in the enclosure. If all attempts fail, no SES path device in the enclosure is available.

If there are no available SES path devices in the enclosure, the host clears any persistent reservation on an SES path device owned by another host and uses that SES path device to access SES services (step 440) as described below in reference to FIG. 5B. In one implementation, the host continues to use the same SES path device that was used in step 430 or step 440 for subsequent SES accesses (repeatedly clearing persistent reservations if necessary) until the host becomes aware of a change in the ownership of an SES path devices in the enclosure (e.g., when a failover monitor pushes new ownership information to the host). Alternatively, the host can re-check for available SES path devices each time the host wants to access SES services.

As shown in FIG. 5A, a conventional process 500 is used to place and maintain persistent reservations on an SES path device by a host that owns the SES path device. The host places a persistent reservation on the owned SES path device (step 510), for example, when the host first assumes ownership of the SES path device. The persistent reservation prevents any other host from writing to or the SES path device or using the SES path device to access SES services. The persistent reservation can be established by using the SES PERSISTENT RESERVE OUT/REGISTER and PERSISTENT RESERVE OUT/RESERVE commands. The host checks the status of the persistent reservation on the SES path device periodically (e.g., every thirty seconds) (step 520). The host determines whether the persistent reservation still is in place on the SES path device (step 530). If the persistent reservation still is in place, the host continues to check the status of the persistent reservation periodically. If the persistent reservation is no longer in place, the host renews (that is, reestablishes) the persistent reservation.

As shown in FIG. 5B, a process 550 allows a host that does not own an SES path device in an enclosure to access SES services through an SES path device that is owned by another host. Process 550 can be implemented, for example, in the SES driver layer 350 shown in FIG. 3. A persistent reservation typically is present on the SES path device because the host that owns the SES path device places and renews persistent reservations, as discussed above in reference to FIG. 5A. The non-owning host needs to use the SES path device to manage and/or sense the state of elements in the enclosure containing the SES path device (step 560). The non-owning host issues the SES PERSISTENT RESERVE OUT/CLEAR command to clear transiently the persistent reservation that the owning host placed (step 570). The non-owning host need not establish its own persistent reservation on the SES path device because the non-owning host is not wresting ownership of the SES path device from the owning host, it is transiently clearing the reservation, which means that the owning host can renew the reservation when it desires. However, the non-owning host optionally can place a transient reservation on the SES path device (step 580). A transient reservation is a reservation (e.g., a persistent reservation) that the non-owning host keeps in place only long enough to access SES services using the SES path device and removes thereafter. If a transient reservation is to be used, the non-owning host can issue the SES PERSISTENT RESERVE OUT/PREEMPT command instead of the SES PERSISTENT RESERVE OUT/CLEAR command in step 570. When a reservation is preempted, the non-owning host clears the existing persistent reservation and places its own persistent reservation on the SES path device, thus combining steps 570 and 580. After the owning host's persistent reservation is cleared (or preempted), the non-owning host accesses SES services through the SES path device (step 590). If the owning host renews the persistent reservation after the non-owning host clears the persistent reservation but before the non-owning host is finished accessing the SES services, the non-owning host's attempt to access the SES services will fail. If the attempt fails, the non-owning host can wait to access the SES services until a next time it needs to access SES services. Alternatively, the non-owning host can clear the owning host's persistent reservation immediately and attempt to access the SES services again.

In one implementation, a host that owns an SES path device in an enclosure accesses SES services for the enclosure at a rate of once every ten seconds. A host that does not own an SES path device in an enclosure but does own a disk in the enclosure accesses SES services for the enclosure at a rate of once every minute. A host typically can ignore the SES status information for an enclosure in which the host does not own any devices. A host's SES access rate can be increased to once every six seconds if the host detects a possible environmental error (e.g., an over temperature condition) in the enclosure and is checking the validity of the possible error. A host checks the SES path devices that it owns for persistent reservations at a rate of once every thirty seconds and renews any reservations that have been cleared.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD- ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results. One of the hosts (e.g., host 130(*a*) or 130(*b*) in FIG. 1A) can be a monitor that monitors the status and/or environmental conditions of the storage arrays but does not perform storage operations. Persistent reservations can be cleared transiently to allow a host that does not own a SCSI disk (a non-owning host) to write to the disk. For example, a host that owns the disk (an owning host) and the non-owning host can agree to use certain blocks on the disk to exchange information and/or data. The owning host reads from and writes to the disk freely, and the non-owning host reads from the disk freely. When the non-owning host needs to write to the disk, the non-owning host transiently clears the owning host's persistent reservation and writes to the disk.

What is claimed is:

1. A method, comprising:
   determining, by a monitor, that the monitor requires temporary access to a Small Computer System Interface (SCSI) Enclosure Services (SES) path device that is owned by a first host, the first host currently having a persistent reservation on the SES path device and the monitor configured not to perform storage operations;
   checking an enclosure, by the monitor, for an available path device;
   in response to no available path device, clearing transiently by the monitor the persistent reservation of the first host and accessing transiently, by the monitor, the SES path device;
   placing, by the monitor, a transient reservation on the SES path device, the transient reservation preventing any other host from placing a new persistent reservation on the SES path device until the monitor is done using the SES path device for the monitor's required temporary access;
   removing, by the monitor, the transient reservation placed on the SES path device by the monitor, removing allowing the first host to place a persistent reservation on the SES path device during a periodic check performed by the first host, the periodic check determining that the first host does not have a persistent reservation on the SES path device; and
   in response to the periodic check determining that the first host does not have a persistent reservation on the SES path device, renewing, by the first host, the persistent reservation, previously owned by the first host, on the SES path device.

2. The method of claim 1, wherein the path device is a SCSI disk.

3. The method of claim 2, wherein the path device is a fibre-channel SCSI disk.

4. The method of claim 3, wherein the first host and the monitor are coupled with a plurality of enclosure devices of the enclosure over a fibre-channel storage area network.

5. The method of claim 1, wherein the first host and the monitor are coupled with a plurality of enclosure devices of the enclosure over a storage area network.

6. The method of claim 1, wherein at least one of the first host and the monitor is a data server.

7. The method of claim 1, further comprising: accessing the available path device.

8. The method of claim 7, wherein the available path device is selected from a group consisting of: a path device without a reservation, and a path device transiently owned by the monitor.

9. The method of claim 1, wherein the persistent reservation blocks any other host, other than the owning host, from accessing an SES function that uses the owned SES path device.

10. The method of claim 1, wherein a transient reservation is a persistent reservation that the monitor keeps in place only long enough to access the SES path device and then removes the transient reservation thereafter.

11. The method of claim 1, clearing transiently further comprising:
    clearing, by the monitor, the persistent reservation of the first host only long enough to access the SES path device and then removing the persistent reservation placed by the monitor thereafter.

12. An apparatus, comprising:
    a processor;
    a network adaptor configured to communicate with a network;
    a storage adaptor configured to communicate with one or more storage arrays; and
    a memory adapted to store a Small Computer System Interface (SCSI) Enclosure Services (SES) driver process, the SES driver process when executed operable to,
       determine, by a monitor, that the monitor requires temporary access to a Small Computer System Interface (SCSI) Enclosure Services (SES) path device that is owned by a first host, the first host currently having a persistent reservation on the SES path device and the monitor configured not to perform storage operations,
       check the enclosure, by the monitor, for an available path device, in response to no available path device, clear transiently the persistent reservation in response to no available path device and access transiently, by the monitor, the SES path device, place, by the monitor, a transient reservation on the SES path device, the transient reservation preventing any other host from placing a new persistent reservation on the SES path device until the monitor is done using the SES path device for the monitor's required temporary access, and remove by the monitor, the transient reservation placed on the SES path device by the monitor, removing allowing the first host to place a persistent reservation on the SES path device during a periodic check performed by the first host, the periodic check determining that the first host does not have a persistent reservation on the SES path device, and in response to the periodic check determining that the first host does not have a persistent reservation on the SES path device, renew, by the first host, the persistent reservation, previously owned by the first host, on the SES path device.

13. The apparatus of claim 12, wherein the path device is a SCSI disk.

14. The apparatus of claim 13, wherein the path device is a fibre-channel SCSI disk.

15. The apparatus of claim 14, wherein the storage adaptor is coupled with a plurality of enclosure devices of the enclosure over a fibre-channel storage area network.

16. The apparatus of claim 12, wherein the storage adaptor is coupled with a plurality of enclosure devices of the enclosure over a storage area network.

17. The apparatus of claim 12, wherein the apparatus is a data server.

18. The apparatus of claim 12, wherein the monitor is configured not to perform storage operations.

19. The apparatus of claim 12, further comprising: accessing the available path device.

20. The apparatus of claim 19, wherein the available path device is selected from a group consisting of: a path device without a reservation, and a path device transiently owned by the apparatus.

21. The method of claim 12, wherein the persistent reservation blocks any other host, other than the owning host, from accessing an SES function that uses the owned SES path device.

22. The method of claim 12, wherein a transient reservation is a persistent reservation that the monitor keeps in place only long enough to access the SES path device and then removes the transient reservation thereafter.

23. The method of claim 12, clears transiently further comprising:

clears, by the monitor, the persistent reservation of the first host only long enough to access the SES path device and then removing the persistent reservation placed by the monitor thereafter.

24. A system, comprising:

a Small Computer System Interface (SCSI) Enclosure Services (SES) path device;

a first host configured to place a persistent reservation on the SES path device, and further configured to renew the persistent reservation periodically in response to the persistent reservation not operating on the path device; and a monitor configured to, determine, by a monitor, that the monitor requires temporary access to a Small Computer System Interface (SCSI) Enclosure Services (SES) path device that is owned by a first host, the first host currently having a persistent reservation on the SES path device and the monitor configured not to perform storage operations;

check the enclosure, by the monitor, for an available path device, in response to no available path device, clear transiently the persistent reservation in response to no available path device and access transiently, by the monitor, the SES path device, place, by the monitor, a transient reservation on the SES path device, the transient reservation preventing any other host from placing a new persistent reservation on the SES path device until the monitor is done using the SES path device for the monitor's required temporary access, and remove by the monitor, the transient reservation placed on the SES path device by the monitor, removing allowing the first host to place a persistent reservation on the SES path device during a periodic check performed by the first host, the periodic check determining that the first host does not have a persistent reservation on the SES path device, and in response to the periodic check determining that the first host does not have a persistent reservation on the SES path device, renew, by the first host, the persistent reservation previously owned by the first host, on the SES path device.

25. The system of claim 24, wherein the path device is a SCSI disk.

26. The system of claim 25, wherein the path device is a fibre-channel SCSI disk.

27. The system of claim 26, further comprising: a plurality of enclosure devices of an enclosure coupled with the first host and the apparatus over a fibre-channel storage area network.

28. The system of claim 24, further comprising: a plurality of enclosure devices of an enclosure coupled with the first host and the apparatus over a storage area network.

29. The system of claim 24, wherein at least one of the first host and the apparatus is a data server.

30. The system of claim 24, wherein the monitor is further configured to: access the available path device in response to an available path device.

31. The system of claim 30, wherein the available path device is selected from a group consisting of: a path device without a reservation, and a path device transiently owned by the monitor.

32. A machine readable storage containing executable program instructions for transiently accessing a Small Computer System Interface (SCSI) Enclosure Services (SES) path device, the executable instructions comprising one or more program instructions for:

determining, by a monitor, that the monitor requires temporary access to an SES path device, the path device that is owned by a first host, the first host currently having a persistent reservation on the SES path device and the monitor configured not to perform storage operations;

checking the enclosure, by the monitor, for an available path device;

clearing transiently the persistent reservation in response to no available path device and access transiently, by the monitor, the SES path device in response to no available path device;

placing, by a monitor, a transient reservation on the SES path device, the transient reservation preventing any other host from placing a new persistent reservation on the SES path device until the monitor is done using the SES path device for the monitor's required temporary access; and removing by the monitor, the transient reservation placed on the SES path device by the monitor, removing allowing the first host to place a persistent reservation on the SES path device during a periodic check performed by the first host, the periodic check determining that the first host does not have a persistent reservation on the SES path device; and renewing, by the first host, the persistent reservation previously owned by the first host, on the SES path device in response to the periodic check determining that the first host does not have a persistent reservation on the SES path device.

33. The method of claim 24, wherein the persistent reservation blocks any other host, other than the owning host, from accessing an SES function that uses the owned SES path device.

34. The method of claim 24, wherein a transient reservation is a persistent reservation that the monitor keeps in place only long enough to access the SES path device and then removes the transient reservation thereafter.

35. The method of claim 24, clears transiently further comprising:

clears, by the monitor, the persistent reservation of the first host only long enough to access the SES path device and then removing the persistent reservation placed by the monitor thereafter.

36. A method for controlling access to a Small Computer System Interface device (SCSI device), comprising:

checking by a monitor for a SCSI device that is available, the monitor configured to not perform storage operations;

determining that a particular SCSI device is owned by a first host, the first host having a persistent reservation on the SCSI device;

clearing by the monitor the persistent reservation in response to no available path device, and placing by the monitor a transient reservation on the particular SCSI device, the transient reservation preventing any other host from placing a new persistent reservation on the SCSI device;

checking periodically by the first host to determine if the transient reservation has been removed;

performing an access of the SCSI device by the monitor in response to the transient reservation, and removing the transient reservation by the monitor upon completion by the monitor of the access; and renewing the persistent reservation by the first host upon detection that the transient reservation has been removed.

\* \* \* \* \*

UNITED STATES PATENT AND TRADEMARK OFFICE
CERTIFICATE OF CORRECTION

PATENT NO. : 7,577,802 B1  Page 1 of 1
APPLICATION NO. : 11/109217
DATED : August 18, 2009
INVENTOR(S) : Parsons It is certified that error appears in the above-identified patent and that said Letters Patent is hereby corrected as shown below:

Col. 5, Line 11, please amend as shown:

130(b) over the network 120. The clients ~~110(a)-110(c)~~ 110(a)-110(c)

Signed and Sealed this

Twenty-third Day of February, 2010

David J. Kappos
*Director of the United States Patent and Trademark Office*